US006344654B1

(12) United States Patent
Lesko

(10) Patent No.: US 6,344,654 B1
(45) Date of Patent: Feb. 5, 2002

(54) FLUORESCENT POLYMERS AND COATING COMPOSITIONS

(75) Inventor: Patricia Marie Lesko, Ottsville, PA (US)

(73) Assignee: Rohm and Haas Company, Philadelphia, PA (US)

( * ) Notice: Subject to any disclaimer, the term of this patent is extended or adjusted under 35 U.S.C. 154(b) by 0 days.

(21) Appl. No.: 09/231,386

(22) Filed: Jan. 13, 1999

Related U.S. Application Data

(62) Division of application No. 08/861,355, filed on May 21, 1997, now Pat. No. 5,897,811.
(60) Provisional application No. 60/018,233, filed on May 24, 1996.

(51) Int. Cl.[7] .............................................. C09K 11/02
(52) U.S. Cl. .............................. 250/459.1; 252/301.35; 252/301.16
(58) Field of Search ....................... 252/301.16, 301.17, 252/301.35; 250/459.1, 461.1

(56) References Cited

U.S. PATENT DOCUMENTS

| 5,043,406 A | | 8/1991 | Fong | 526/304 |
|---|---|---|---|---|
| 5,125,929 A | | 6/1992 | Amey | 8/544 |
| 5,344,958 A | | 9/1994 | Tanaka et al. | 564/426 |
| 5,573,909 A | | 11/1996 | Singer et al. | 435/6 |
| 5,897,811 A | * | 4/1999 | Lesko | 252/301.35 |

FOREIGN PATENT DOCUMENTS

| FR | 2736 061 A | 6/1995 |
|---|---|---|
| JP | 4-051241 | 2/1992 |

OTHER PUBLICATIONS

Article entitled: "A Preparative Synthesis of Lumiphore–Labeled Polymers" by Ben–Zhong Tang, Steven Holdcroft and James E. Guillet, ©1994 Macromoiecules vol. 27, pp. 5487 to 5490.

Article entitled: "Dye Distribution in Fluorescent–Labeled Latex Prepared by Emulsion Polymerization" by Stanislaw Sosnowski, Jianrong Feng, and Mitchell A. Winnik Department of Chemistry and Erindale College, University of Toronto, Toronto, Ontario, Canada pp. 1497–1505.

Article entitled: On the Copolymerization of Styrene and Acrylonitrile with 1,8–Naphthalimide Derivatives (Optical Brightening Agents) pp. 40–44 by T.N. Konstantinova & I.K. Grabchev © 1997 Sci. Polymer International vol. 43, No. 1, 1997.

* cited by examiner

*Primary Examiner*—Georgia Epps
*Assistant Examiner*—Richard Hanig

(57) ABSTRACT

Disclosed is a method of preparing a fluorescent polymer, whereby an ethylenically unsaturated monomer is copolymerized with a polynuclear aromatic hydrocarbon or a substituted aromatic derivative thereof, such that the resultant polymer is fluorescent. Also disclosed are coating compositions containing such fluorescent polymers.

3 Claims, No Drawings

FLUORESCENT POLYMERS AND COATING COMPOSITIONS this application is a divisional application of application Ser. No. 08/861,355, filed May 21, 1997, now U.S. Pat. No. 5,897,811, which claims priority to Ser. No. 60/018,233 filed May 24, 1996.

BACKGROUND OF THE INVENTION

The present invention relates to a method for preparing fluorescent polymers, and coating compositions containing such fluorescent polymers. In particular, the present method relates to the inclusion of fluorescent compounds in the preparation of polymers useful in coating compositions such that the resultant compositions are detectable by fluorescent means.

A method for preparing a fluorescent polymer is disclosed in U.S. Pat. No. 5,125,929 (Amey). There, a Michael addition reaction produces a linear aminoacid polymer which is fluorescent. In this case, the fluorescence is produced by the polymer backbone. This method is limited by the nature of its chemistry. Moreover, most polymers produced by a Michael addition reaction will not have fluorescence.

U.S. Pat. No. 5,043,406 (Fong) discloses a method for incorporating fluorescent moieties into acrylamide polymers by copolymerizing acrylamide monomers with monomers containing pendant fluorescent moieties. The principal limitation to this method is the lack of commercially available monomers containing pendant fluorescent moieties. Even if other monomers could be modified to incorporate pendant fluorescent moieties, the increased cost of doing so would make the cost of such fluorescent polymers prohibitive.

Both the methods described by Amey and Fong are limited in applicability, either by virtue of the nature of the chemistry involved, or by the lack of available fluorescent starting materials. What is needed is a method for incorporating fluorescence into a broad variety of polymers, thus permitting broader usage of such fluorescent polymers.

STATEMENT OF THE INVENTION

A first embodiment of the present invention is directed to a method for preparing a fluorescent polymer, comprising copolymerizing one or more ethylenically unsaturated monomers with a fluorescent compound selected from the group consisting of polynuclear aromatic hydrocarbons and their substituted aromatic derivatives; wherein the resultant polymer contains a fluorescent group.

A second embodiment of the present invention is directed to a coating composition having enhanced UV durability, comprising a fluorescent polymer prepared by copolymerizing an ethylenically unsaturated monomer with a fluorescent compound selected from the group consisting of: polynuclear aromatic hydrocarbons and their substituted aromatic derivatives; and ethylenically unsaturated monomers having pendant fluorescent functionality.

A third embodiment of the present invention is directed to a method for identifying and quantifying the amount, if any, of fluorescent polymer contained in a coating composition, such method comprising the steps of: (a) obtaining a sample of the coating composition or resulting coating to be tested; (b) detecting the fluorescence; and (c) measuring the intensity or the wavelength of the fluorescence of the fluorescent polymer contained in the sample.

DETAILED DESCRIPTION OF THE INVENTION

As used in this specification, the following terms have the following definitions, unless the context clearly indicates otherwise. "Latex" or "latex composition" refers to a dispersion of a water-insoluble polymer which may be prepared by conventional polymerization techniques such as, for example, by emulsion polymerization. "Latex" also refers to polymer dispersed in an aqueous composition, wherein the polymer can be prepared directly in the aqueous medium, or first prepared in a non-aqueous medium (e.g., using solution polymerization) and then subsequently dispersed in the aqueous medium. "Fluorescent" or "fluorescence" refers to a compound which, when excited by radiation, occupies a second excited state which is said to "fluoresce" or emit radiation at a lower energy (longer wavelength) than the original excited state. "Chromophore" refers to a compound having fluorescence which is capable of being covalently attached to a polymer. "Backbone" refers to the main chain of a polymer exclusive of pendant or end groups; "pendant" refers to a group suspended from the main chain of a polymer; and "end" refers to a group suspended from the end of a polymer chain. "PVC" used in reference to paint means pigment volume concentration. The terms "group" and "moiety" are used interchangeably. The following abbreviations are used: cm=centimeter, mm=millimeters, nm=nanometers, mL=milliliters, HPLC=high pressure liquid chromatography, UV=ultraviolet, ai=active ingredient. Ranges specified are to be read as inclusive, unless specifically identified otherwise.

It has now been discovered that certain weak polymerization inhibitors can be used to incorporate fluorescent moieties into a broad variety of polymers by free radical copolymerization of the polymerization inhibitors with the appropriate monomers. These polymerization inhibitors can be broadly classified as polynuclear aromatic hydrocarbons. Examples of such polynuclear aromatic hydrocarbon clromophores can be found in Russian Patent 478839 (Gladyshev) and "Polymerization Inhibition by Aromatic Compounds," *J. Polymer Sci.*, 52:31 (1961). It has also been found that substituted aromatic derivatives of such polynuclear aromatic hydrocarbons can also be used in this fashion. Such derivatives are those wherein the polynuclear aromatic hydrocarbon is substituted without loss of aromaticity. These substituents include but are not limited to: $C_{1-12}$ branched or straight chain alkyl or aryl groups optionally substituted with heteroatoms; carboxylic acids and esters thereof; sulfonic acids and derivatives thereof; cyano groups; and halogens. Preferred polynuclear aromatic hydrocarbons include: naphthalene, anthracene, phenanthrene, fluoranthene, acridine, carbazole, pyrene, chrysene, triphenylene, perylene, and their substituted aromatic derivatives. It is especially preferred to use naphthalene, anthracene, phenanthrene, fluoranthene, and their substituted aromatic derivatives. Combinations of chromophores can also be used.

In another embodiment of the present invention, the fluorescent polymers are used as markers for product identification. In this respect, other types of fluorescent polymers can be utilized. For example, such polymers can be prepared by copolymerizing the appropriate monomers with an ethylenically unsaturated monomer having pendant fluorescent functionality.

Detection of the fluorescent polymers is accomplished by taking a sample of the coating composition or the resulting (applied) coating, and analyzing the sample to determine the fluorescence wavelength, and the intensity of the fluorescence emission. HPLC or GPC analysis may be used to determine whether or not the fluorescent moiety is covalently attached to the polymer. (See, for example, S. Sosnowski et al., *J. Polymer Sci.*, Part A: Polymer Chemistry 32:1497 (1994).) If a sample of the applied coating is used, it may be useful to extract the polymer from the other coating components prior to analysis, in accordance with methods known to those skilled in the art.

Examples of ethylenically unsaturated monomers having pendant fluorescent functionality can be found in: U.S. Pat. No. 5,043,406 (Fong), S. Sosnowski et al., *J. Polymer Sci Part A: Polymer Chemistry* 32:1497 (1994), C. L. Zhao et al., *Macromolecules*, 23:4082 (1990), E. M. Boczar et al., *Macromolecules*, 26:5772 (1993), M. A. Fox et al., *Macromolecules*, 23:4533 (1990), and C. Simionescu et al., *J. Polymer Sci.*, 23:2089 (1985). Preferred ethylenically unsaturated monomers having pendant fluorescent functionality include: naphthylmethyl methacrylate, naphthylethyl methacrylate, 9-anthryl methacrylate, 9-anthrylmethyl methacrylate, 2-(9-anthryl)ethyl methacrylate, 1'-(9-anthryl) ethyl methacrylate, 3-hydroxy-2-methylene-3-(1-naphthyl) propionic acid, N-dibenzosuberenyl acrylamide, (9-phenanthryl)methyl methacrylate, and 9-vinyl phenanthrene. It is especially preferred to use naphthylethyl methacrylate, 9-anthryl methacrylate, 3-hydroxy-2-methylene-3-(1-naphthylpropionic acid, (9-phenanthryl) methyl methacrylate, 9-vinyl phenanthrene, or combinations thereof.

Regardless of whether the chromophore being incorporated into the polymer is a polynuclear aromatic hydrocarbon or an ethylenically unsaturated monomer having pendant fluorescent functionality, the method of incorporation is similar. The chromophore is treated as another component in the free radical polymerization process, and is generally added to the monomers at the start of the reaction; however, variations from this procedure are known to those skilled in the art. The polymerization can be conducted in any medium, including aqueous media, polar or non-polar organic solvents, or combinations thereof. Such polymerization techniques are well known to those skilled in the art, and will not be further discussed herein.

The amount of chromophore utilized in the preparation of the fluorescent polymers of the present invention will vary, depending on the type of chromophore and how the chromophore is attached to the resultant polymer (whether it is a pendant or end group, or inserted into the polymer backbone); however, the chromophores will typically be added to the monomer mixture in an amount between 0.001 and 3.0 wt %. It is preferred to add chromophore in an amount between 0.005 and 1.0 wt %, and most preferred to add between 0.01 and 0.5 wt %.

Typical comonomers that are useful in this invention are those that are capable of undergoing free radical polymerization. The choice of comonomer will vary, depending on the choice of chromophore. As used in this specification, the term "acrylic" is used in a general sense to describe polymers wherein at least one of the monomers is of the acrylic or methacrylic type, including acrylic and methacrylic acids, esters of acrylic acid or methacrylic acid, and substituted derivatives thereof. "(Meth)acryl-" includes both acrylic and methacrylic derivatives. Such monomers are well known in the art. Examples of such acrylic nonomers include: alkyl (meth)acrylates such as methyl methacrylate, ethyl acrylate, methyl acrylate, n-butyl acrylate, 2-ethylhexyl acrylate, lauryl acrylate, cyclohexyl acrylate, isopropyl acrylate, isobutyl acrylate, n-amyl acrylate, n-propyl acrylate, ethyl methacrylate, n-propyl methacrylate, n-butyl methacrylate, isopropyl methacrylate, n-octyl methacrylate, dodecyl methacrylate, neopentyl acrylate, n-tetradecyl acrylate, n-tetradecyl methacrylate, isobutyl methacrylate, n-amyl methacrylate, n-hexyl methacrylate, isoamyl methacrylate, cyclopentyl methacrylate, n-decyl methacrylate, and the like; other acrylate and methacrylate esters such as 2-bromoethyl methacrylate, isobornyl methacrylate, phenyl methacrylate, benzyl methacrylate, 2-phenylethyl methacrylate, 3-methoxybutyl acrylate, 2-methoxybutyl methacrylate, and 2-n-butoxyethyl methacrylate; active hydrogen-functional monomers including hydroxy-substituted (meth)acrylates such as 2-hydroxyethyl acrylate and 3-hydroxypropyl acrylate; (meth)acryiate including sulfonic acids such as sulfoethyl methacrylate, and sulfopropyl acrylate; and phosphoric acids such as 2-phosphoethyl (meth)acrylate,.

Additional comonomers which can be used in the present invention include: butadiene, styrene, alpha-methyl s tyrene, s odium styrene sulfonate, v inyl toluene, acrylonitrile, methacrylonitrile, alpha-chloroacrylonitrile, ethyl acrylonitrile, methyl vinyl ether, isopropyl vinyl ether, n-butyl vinyl ether, isobutyl vinyl ether, t-butyl vinyl ether, 2-ethylhexyl vinyl ether, 4-hydroxybutyl vinyl ether, 1,4-butaneglycol divinyl ether, diethyleneglycol divinyl ether, vinyl esters such as vinyl acetate, vinyl versatate, vinyl propionate, vinyl butyrate, vinyl isobutyrate, vinyl caproate, vinyl 2-ethyihexonate and vinyl decanoate; allyl chloride, methallyl chloride, vinylidene chloride, vinyl chloride, vinyl fluoride, vinyldene fluoride, sodium vinyl sulfonaate, butyl vinyl sulfonate, phenyl vinyl sulfone, methyl vinyl sulfone, N-vinyl pyrrolidinone, N-vinyl oxazolidinone, acrolein, acrylamide, methacrylamide, N,N-dime thyl(meth) acrylamide, methylolacrylamide, N-butoxy(meth) acrylamide, isobutoxy(mieth)acrylalmide and the like, allyl triethoxysilane, allyl tris(trimethyls iloxy) silane, 3-acryloxypropyltrimethoxy silane, and the like; other ethylenically unsaturated carboxylic acids and their esters, such as dialkyl and trialkyl esters of di-and tri-carboxylic acids such as itaconic acid and the like, including di(2-ethylhexyl) maleate, dibutyl maleate, dimethyl fumarate, dimethyl itaconate, diethyl citraconate, trimethyl aconitate, diethyl mesaconate, di(2-ethylhexyl) itaconate, di-(2-chloroethyl) itaconate, maleic acid, maleic anhydride, fumaric acid, itaconic acid; and olefins, such as diisobutylene, 1-octene, 1-decene, 1-hexadecene and the like.

These types of monomers are typically polymerized in the presence of water-soluble or oil-soluble initiators. Examples of useful initiators include: persulfates, peroxides, hydroperoxides, percarbonates, per acetates, perbenzoates, azo-functional compounds and other free-radical generating species.

Surfactants are commonly used in emulsion or dispersion polymerization to provide stability, as well as to control particle size. Conventional surfactants include anionic or nonionic emulsifiers or their combination. Typical anionic emulsifiers include but are not limited to: alkali or ammonium alkyl sulfates, alkali or ammonium alkylether sulfates, alkali or ammonium alkylarylether sulfates, alkyl sulfonates, salts of fatty acids, esters of sulfosuccinic acid salts, alkyl diphenylether disulfonates, and salts or free acids of complex organic phosphate esters. Typical nonionic emulsifiers include but are not limited to: polyethers, e.g. ethylene oxide and propylene oxide condensates which include straight and branched chain alkyl and alkylaryl polyethylene glycol and polypropylene glycol ethers and thioethers, alkyl phenoxypoly(ethyleneoxy) ethanols having alkyl groups containing from about 7 to about 18 carbon atoms and having from about 4 to about 100 ethyleneoxy units, and polyoxyalkylene derivatives of hexitol, including sorbitans, sorbides, mannitans, and mannides. Surfactants may be employed in the polymer compositions of the present invention at levels of 0.1–3 wt % or greater, based on the total weight of the final composition.

In preparing the fluorescent polymers of the present invention, any chain-transfer agent, or mixtures thereof, may be used to control molecular weight. Suitable chain transfer agents include, for example, $C_{1-12}$ alkyl or functional alkyl mercaptans, alkyl or functional alkyl mercaptoalkanoates, or halogenated hydrocarbons, and may be employed in the polymer at levels of 0.01–10 wt %, based on the weight of the polymer.

It is also sometimes useful to increase molecular weight of the resulting polymers. This can be accomplished by addition of ethylenically unsaturated monomer comprising at least two sites of ethylenically unsaturation. Examples of such compounds include: ethylene glycol dimethacrylate, diethylene glycol dimethacrylate, triethylene glycol dimethacrylate, polyethylene glycol dimethacrylate, polypropylene glycol dimethacrylate, neopentyl glycol dimethacrylate, 1,3-butylene glycol diacrylate, neopentyl glycol diacrylate, trimethylolethane trimethacrylate, dipentaerythritol triacrylate, dipentaerythritol tetraacrylate, dipentaerythritol pentaacrylate, dimethallyl chlorendate, diallyl chlorendate, diallyl fumarate, diallyl itaconate, diallyl phthalate, diallyl isophthalate, triallyl isocyanate, triallyl trimellitate, 1,6-hexanediol diacrylate, 1,3-butylene glycol dimethacrylate, trimethylolpropane trimethacrylate, trimethylolpropane triacrylate, tripropylene glycol diacrylate, allyl methacrylate, and divinyl benzene. Such compounds may be employed in the polymer at levels of 0.01–10 wt %, based on the weight of the polymer.

Other optional components that can be included in this invention include co-solvents, pigments, fillers, dispersants, curing agents, wetting agents, anti-foam agents, UV absorbers, antioxidants, biocides, and stabilizers.

The coating compositions of the present invention can be used to provide coatings on suitable substrates such as wood and reconstituted wood products, concrete, asphalt, fiber cement, stone, marble, clay, plastics (for example, polystyrene, polyethylene, ABS, polyurethane, polyethylene terphthalate, polybutylene terphthalate, polypropylene, polyphenylene, polycarbonate, polyacrylate, polyvinyl chloride, Noryl®, and polysulfone), paper, cardboard, textiles, leather, and metal (ferrous as well as non-ferrous). It has surprisingly been discovered that the inclusion of the fluorescent polymers of the present invention in coating compositions produces in enhanced UV durability of the resultant coatings. The coating compositions of the present invention are therefore preferably used to coat substrates that are routinely subjected to UV light (e.g., outdoor applications).

The coating compositions of the present invention can be applied to desired substrates using conventional application techniques such as conventional or airless spray, roll, brush, curtain, flood, and dip-coating methods. Once applied to the substrate, the coating compositions can be cured at ambient or elevated temperatures.

Test Methods

Gloss Retention

Films of each test paint were drawn down on Leneta(® 5C we charts using a 3 mil (0.076 mm) Bird® Film Applicator. The films were allowed to dry for seven days at 25° C. and 50% relative humidity. Then initial readings were taken of the 20° and 60° gloss (the light reflected at angles of 20° and 60° from the perpendicular) using a Glossgard® II Glossmeter. The 20° and 60° gloss readings were repeated after Weather-O-meter® exposure and reported as a percent retention of the original value. Loss of gloss is a measure of poor durability; thus a higher percent retention indicates better durability.

Dirt Pick-up Resistance

Films of each test paint were drawn down on aluminum "Q" panels (Alodine® 1200S) using a 3 mil (0.076 mm) Bird® Film Applicator. The films were allowed to dry for seven days at 25° C., 50% relative humidity before Weather-O-meter® exposure. After exposure, a reflectometer was used to measure the Y reflectance of the paint film. The panels were then "soiled" using an iron oxide slurry (250 g water, 2 drops of an anionic dispersant, 125 g of iron oxide, well dispersed), air dried three hours and oven dried at 60° C. for one hour. After the panels had cooled to room temperature, the paint films were washed under running water using a cheesecloth pad, and air dried for four hours. The reflectometer was used to remeasure the Y-reflectance over the soiled area, which was reported as a percent of the original reading. A higher percent retention indicates cleaner paint films, which indicates better durability.

The following examples are presented to illustrate further various aspects of the present invention, but are not intended to limit the scope of the invention in any respect. The abbreviations listed below are used throughout the examples.

| | |
|---|---|
| AA = Acrylic Acid | MMA = Methyl Methacrylate |
| BA = Butyl Acrylate | Sty = Styrene |
| BMA = Butyl Methacrylate | AnMA = 9-Anthryl Methacrylate |
| EA = Ethyl Acrylate | NEMA = 1-Naphthylethyl Methacrylate |
| MAA = Methacrylic Acid | |

EXAMPLE 1

Preparation of Acrylic Latex with 9-Anthryl Methacrylate

Composition: 47 BA/52 MMA/1 AnMA

The polymerization is carried out in a 1 liter, four-neck, round bottomglass flask equipped with a mechanical blade stirrer, a thermocouple to monitor temperature, a reflux condenser, means to heat and cool, and a nitrogen atmosphere. The flask was charged with 200 g of deionized water and 0.5 g of sodium dodecylbenzene sulfonate, and then heated to 85° C. A monomer pre-emulsion was prepared from 90 g of deionized water, 0.5 g of sodium dodecylbenzene sulfonate, 118 g of butyl acrylate, 130 g of methyl methacrylate, and 2.5 g of 9-anthryl methacrylate. The pre-emulsion (12.5 g) was added to the flask, followed by 0.75 g of ammonium persulfate (APS) dissolved in 5 g of water. Fifteen minutes later, a 2.5 hour, linear feed of the remaining pre-emulsion and 0.4 g of APS dissolved in 75 g of deionized water was begun. Heating and cooling were applied as necessary to maintain the reaction temperature at 85° C. When the additions were complete, 30 g of deionized water were used to rinse the pre-emulsion container into the flask.

After 30 minutes, the flask was cooled to 60° C., and 0.003 g of FeSO$_4$×7 H$_2$O, 1.5 g of 70% aqueous t-butyl hydroperoxide, and 0.9 g of sodium formaldehyde sulfoxylate in a total of 33.5 g of deionized water were added to the flask mixture. The reaction mixture was cooled to room temperature and filtered. A polymer latex with a solids content of 41.0 % by weight (wt %), a particle size of 83 nm, and a pH of 2.5 was obtained. The polymer fluoresced at 413 nm (ex 364 nm).

EXAMPLE 2

Preparation of Acrylic Latex with 1-Naphthylethyl Methacrylate

Composition: 47 BA/52.1 MMA/0.9 NEMA

The procedure of Example 1 was followed, except that the monomer pre-emulsion was prepared from 90 g of deionized water, 0.5 g of sodium dodecylbenzene sulfonate, 118 g of butyl acrylate, 130 g of methyl methacrylate, and 2.3 g of naphthylethyl methacrylate. A polymer latex with a solids content of 41.4 wt %, a particle size of 103 nm, and a pH of 2.3 was obtained. The polymer fluoresced at 340 nm (ex 280 nm).

EXAMPLE 3

Preparation of Styrene Acrylic Latex with 9-Anthryl Methacrylate

Composition: 50 BA/49 Sty/1 AnMA

The procedure of Example 1 was followed, except that the monomer pre-emulsion was prepared from 90 g of deionized water, 0.5 g of sodium dodecylbenzene sulfonate, 125 g of butyl acrylate, 122.5 g of styrene and 2.3 g of 2.5 g of 9-anthryl methacrylate, and at the end of the reaction 0.003 g of $FeSO_4 \times 7\ H_2O$, 2.5 g of t-butyl hydroperoxide, and 1.5 g of sodium formaldehyde sulfoxylate in a total of 54.5 g of deionized water were added. A polymer latex with a solids content of 34.8 wt %, a particle size of 91 nm, and a pH of 2.2 was obtained. The polymer fluoresced at 413 nm (ex 365 nm).

EXAMPLE 4

Preparation of Styrene Acrylic Latex with 1-Naphthylethyl Methacrylate

Composition: 50 BA/49.1 Sty/0.9 NEMA

The procedure of Example 1 was followed, except that the monomer pre-emulsion was prepared from 90 g of deionized water, 0.5 g of sodium dodecylbenzene sulfonate, 125 g of butyl acrylate, 123 g of styrene and 2.3 g of naphthylethyl methacrylate. A polymer latex with a solids content of 40.5 wt %, a particle size of 86 nm, and a pH of 2.2 was obtained. The polymer fluoresced at 340 nm (ex 280 nm).

EXAMPLE 5

Preparation of Acrylic Latex with 9-Anthryl Methacrylate

Composition: 99 EA/1 AnMA

The procedure of Example 1 was followed, except that the monomer pre-emulsion was prepared from 90 g of deionized water, 0.5 g of sodium dodecylbenzene sulfonate, 247.5 g of ethyl acrylate, and 2.5 g of 9-anthryl methacrylate. A polymer latex with a solids content of 40.0 wt %, a particle size of 87 nm, and a pH of 2.7 was obtained. The polymer fluoresced at 413 nm (ex 364 nm).

EXAMPLE 6

Preparation of Acrylic Latex with Anthracene

Composition: 100 BMA/ /1.0 anthracene

The procedure of Example 1 was followed, except that the monomer pre-emulsion was prepared from 250 g of butyl methacrylate and 2.5 g of anthracene (which were stirred together until the anthracene was nearly dissolved), 90 g of deionized water and 0.5 g of sodium dodecylbenzene sulfonate. A polymer latex with a solids content of 40.6 wt %, a particle size of 112 nm, and a pH of 1.9 was obtained. The polymer fluoresced at 426 nm (ex 364 nm).

EXAMPLE 7

Preparation of Acrylic Latex with Anthracene

Composition: 55 BA/43.5 MMA/ 1.5 MAA//0.5 anthracene

The polymerization is carried out in a 3 liter, four-neck, round bottom glass flask equipped with a mechanical blade stirrer, a thermocouple to monitor temperature, a reflux condenser, means to heat and cool, and a nitrogen atmosphere. The flask was charged with 580 g of deionized water, 5.3 g of an ammonium alkymphenol ethoxylate sulfate surfactant (AAESS) 60% ai, and 4.0 g of sodium carbonate. This mixture was then heated to 83° C. A monomer preemulsion was prepared from 550 g butyl acrylate, 435 g methyl methacrylate, 15 g methacrylic acid, and 10 g anthracene (which were stirred together until the anthracene was nearly dissolved), and 252.5 g deionized water, 17 g of AAESS 60% ai, and 1.0 g of sodium lauryl sulfate. The pre-emulsion (55 g) was added to the flask, followed by 3.0 g of APS dissolved in 17 g of water. Fifteen minutes later, a 3.0 hour feed of the remaining pre-emulsion and 1.5 g of APS dissolved in 90 g of deionized water was begun. Heating and cooling were applied as necessary to maintain the reaction temperature at 83° C. When the additions were complete, 35 g of deionized water was used to rinse the preemulsion container into the flask. After 30 minutes, the flask was cooled to 65° C. and 0.012 g of $FeSO_4 \times 7\ H_2O$, 0.012 g of tetrasodium ethylenediaminetetraacetic acid, 4.0 g of 70% aq ueous t-butyl hydroperoxide, and 2.0 g of isoascorbic acid in a total of 132 g of deionized water were added. The pH was raised with 6.7 g of 28% ammonium hydroxide. The reaction mixture was then cooled to room temperature and filtered. A polymer latex with a solids content of 46.7 wt %, a particle size of 130 nm, an d a pH of 6.6 was obtained. The polymer fluoresced at 422 nm (ex 364 nm). Gel permneation chromatography (GPC) using a UV detector and a refractive in dex detector in tandem was used to determine that the fluorescent moieties were covalently attached to the polymer chains.

EXAMPLE 8

Preparation of Acrylic Latex with Anthracene

Composition: 55 BA/43.5 MMA/ 1.5 MAA/ /0.5 anthracene

The procedure of Example 7 was followed except that 5 g of anthracene were used in the pre-emulsion and 2.0 g of t-butyl hydroperoxide and 1.0 g of isoascorbic acid in a total of 68 g of deionized water were used at the end of t he polymerization. A polymer latex with a solids content of 48.9 wt %, a particle size of 126 nr, and a pH of 8.7 was obtained. The polymer fluoresced at 422 nm (ex 364 nm).

EXAMPLE 9 (Comparative)

Preparation of Conventional Acrylic Latex

Composition: 55 BA/43.5 MMA/1.5 MAA

The procedure of Example 7 was followed except that the pre-emulsion was prepared from 175 g deionized water, 17 g of AAESS 60% ai, 550 g butyl acrylate, 435 g methyl methacrylate, and 15 g of methacrylic acid, and at the end of the polymerization 0.006 g of $FeSO_4 \times 7\ H_2O$, 0.006 g of tetrasodium ethylenediaminetetraacetic acid, 1.0 g of 70% aqueous t-butyl hydroperoxide, and 0.5 g of isoascorbic acid in a total of 35 g of deionized water were added. A polymer latex with solids content of 52.2 wt %, a particle size of 124 nm, and a pH of 9.6 was obtained. The polymer did not exhibit fluorescence.

EXAMPLE 10

Preparation of a Styrene-acrylic Latex with Anthracene

Composition: 50 BA/46 Sty/4.0 MAA//0.5 anthracene

The polymerization is carried out in a 3 liter, four-neck, round bottom glass flask equipped with a mechanical blade stirrer, a thermocouple to monitor temperature, a reflux condenser, means to heat and cool, and a nitrogen atmosphere. The flask was charged with 400 g of deionized water and heated to 83° C. 3.5 g of ammonium persulfate dissolved in 12 g of deionized water and 18 g (solids basis) of a 60 nm seed latex with 41.5 g deionized water were added. A monomer pre-emulsion was prepared from 500 g butyl acrylate, 460 g styrene, 40 g methacrylic acid, and 5 g anthracene (which were stirred together until the anthracene was dissolved), and 295 g deionized water, 8.5 g of AAESS 35% ai, and 3.2 g of sodium lauryl sulfate. The monomer pre-emulsion and 1.2 g of ammonium persulfate in 90 g of deionized water were added to the flask over a three hour period. Heating and cooling were applied as necessary to maintain the reaction temperature at 83° C. When the additions were complete, 25 g of deionized water was used to rinse the pre-emulsion container into the reaction flask. After 30 minutes, the flask was cooled to 65° C. and 0.01 g of $FeSO_4 \times 7\ H_2O$, 2.0 g of 70% aqueous t-butyl hydroperoxide, and 1.0 g of isoascorbic acid in a total of 46 g of deionized water were added. The reaction mixture was cooled to room temperature and filtered. A polymer latex with a solids content of 52.7 wt %, a particle size of 216 nm, and a pH of 2.5 was obtained. The polymer fluoresced at 418 nm (ex 364 run).

EXAMPLE 11

Preparation and Evaluation of Semigloss Paints

The latex polymers from Examples 7,8, and 9 were formulated into semnigloss paints which were evaluated before and after accelerated weathering. The recipes for the paint formulations are shown in Table I, and the paint properties are shown in Table II.

TABLE I

24 PVC Paint Formulations (all quantities are in grams)

| Ingredients | Paint A | Paint B | Paint C* |
|---|---|---|---|
| Water | 72 | 72 | 72 |
| Anionic dispersant | 3.7 | 3.7 | 3.7 |
| Nonionic wetting agent | 2.0 | 2.0 | 2.0 |
| Hydroxyethyl cellulose (2.5%) | 50 | 50 | 50 |
| Defoamer | 1.0 | 1.0 | 1.0 |
| Rutile $TiO_2$ | 264.7 | 264.7 | 264.7 |
| Latex 7 | 518.4 | — | — |
| Latex 8 | — | 494.9 | — |
| Latex 9 | — | — | 463.6 |
| Defoamer | 1.0 | 1.0 | 1.0 |
| Nonionic wetting agent | 3.6 | 3.6 | 3.6 |
| Nonionic thickener (20% ai) | 15.0 | 15.0 | 15.0 |
| Hydroxyethyl cellulose (2.5%) | 32 | 27 | 27 |
| Water | 102.8 | 127.8 | 162 |
| Antimicrobial agent | 3.0 | 3.0 | 3.0 |

*Comparative

Evaluation of the paints films for exterior durability was done using an Atlas Weather-O-meter® for accelerated aging of the films. Gloss retention was determined after 840 hours exposure in the Weather-O-meter®, and dirt pick-up resistance was determined after 408 hours exposure in the Weather-O-meter®. The results are summarized in the table below.

TABLE II

Paint Properties

| Initial Property | Paint A | Paint B | Paint C* |
|---|---|---|---|
| Initial Gloss | | | |
| 20° Gloss | 31 | 16 | 16 |
| 60° Gloss | 67 | 59 | 56 |
| % Gloss Retention | | | |
| 20° Gloss | 110 | 98 | 60 |
| 60° Gloss | 106 | 101 | 89 |
| Dirt Pick-up Resistance | 89% | 74% | 71% |

*Comparative

What is claimed is:

1. A coating composition having enhanced UV durability, comprising a fluorescent polymer prepared by copolymerizing an ethylenically unsaturated monomer with a fluorescent compound selected from the group consisting of:

naphthalene, anthracene phenanthrene, fluoranthene acridine, carbazole, pyrene, chrysene, triphenylene, perylene, and their substituted aromatic derivatives; and naohth lmethyl methacrylate, nahthy ethyl methacrylate, 9-anthryl methacrylate, 9-anthrylmethyl methacrylate, 2-(9-anthryl)ethyl methacrylate 1'-(9-anthryl)ethyl methacrylate, 3-hydroxy-2-methylene-3-(1-naphthyl)propionic acid, N-dibenzosuberenyl acrylamide, (9-phenanthryryl)methyl methacrylate, and 9-vinyl phenanthrene.

2. The coating composition of claim 1, wherein the amount of fluorescent compound is between 0.001 and 3.0 weight % based on the total weight of the monomer and the fluorescent compound.

3. A method of preparing a fluorescent polymer, comprising:

copolymerizing one or more ethylenically unsaturated monomers with a fluorescent compound selected from the group consisting of acridine and carbazole and their substituted aromatic derivatives;
wherein the resultant polymer contains a fluorescent group; and
wherein said ethylenically unsaturated monomers comprise no more than 10% by weight, based on the weight of said polymer, of an ethylenically unsaturated monomer containing at least two sites of ethylenic unsaturation.

* * * * *